United States Patent
Greening et al.

(10) Patent No.: US 10,666,062 B2
(45) Date of Patent: *May 26, 2020

(54) SYSTEMS AND METHODS FOR SIMULTANEOUSLY CHARGING A BATTERY WITH MULTIPLE POWER SOURCES

(71) Applicant: Apple Inc., Cupertino, CA (US)

(72) Inventors: Thomas C. Greening, San Jose, CA (US); Kamran M. Hasan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 15/913,634

(22) Filed: Mar. 6, 2018

(65) Prior Publication Data

US 2018/0205252 A1 Jul. 19, 2018

Related U.S. Application Data

(63) Continuation of application No. 15/083,917, filed on Mar. 29, 2016, now Pat. No. 10,069,319.

(Continued)

(51) Int. Cl.
*H02J 7/04* (2006.01)
*H02J 7/16* (2006.01)
*H02J 7/00* (2006.01)

(52) U.S. Cl.
CPC ............... *H02J 7/00* (2013.01); *H02J 7/007* (2013.01); *H02J 7/0071* (2020.01); *H02J 2207/20* (2020.01); *H02J 2207/40* (2020.01)

(58) Field of Classification Search
CPC . H02J 3/00; H02J 50/80; H02J 7/0013; Y02T 90/128; Y02T 90/163;

(Continued)

(56) References Cited

U.S. PATENT DOCUMENTS 5,315,228 A 5/1994 Hess
5,883,497 A 3/1999 Turnbull
(Continued)

FOREIGN PATENT DOCUMENTS

EP 1775654 A1 4/2007
EP 1706929 B1 8/2012
(Continued)

OTHER PUBLICATIONS

"BA-5590/U" Copyright Brooke Clarke, N6GCE, product information, Internet @ http://www.prc68.com/I/BA5590.shtml.

(Continued)

*Primary Examiner* — Nghia M Doan
(74) *Attorney, Agent, or Firm* — Blank Rome LLP

(57) ABSTRACT

Systems and methods for power management are disclosed herein. In one disclosed embodiment, a battery charging system includes a battery charger for simultaneously charging a battery (and/or providing power to a system load) with multiple power sources, using a closed-loop charging servo target based on measurements taken by one or more gauges. In some embodiments, the multiple power sources may be utilized simultaneously according to a charging profile that specifies, e.g., one or more battery charging parameters, as well as according to determined priority levels for one or more of the multiple power sources coupled to the battery. In some embodiments, the priority level of a given power source is not fixed; rather, the priority level for the given power source may change based upon the characteristics of the given power source. In some embodiments, the priority levels for the multiple power sources are implemented using cascaded voltage target values.

19 Claims, 7 Drawing Sheets

Related U.S. Application Data

(60) Provisional application No. 62/305,344, filed on Mar. 8, 2016.

(58) Field of Classification Search
CPC ............ Y02T 10/7241; Y02T 10/7216; Y02T 10/725; B60L 11/1844; B60L 2210/30; B60L 2210/40
USPC .................................. 320/138–140, 160–162
See application file for complete search history.

(56) References Cited

U.S. PATENT DOCUMENTS

| | | | |
|---|---|---|---|
| 5,912,548 | A | 6/1999 | Downs |
| 6,154,012 | A | 11/2000 | Drori |
| 6,433,522 | B1 | 8/2002 | Siri |
| 6,456,044 | B1 | 9/2002 | Darmawaskita |
| 7,053,713 | B1 | 5/2006 | Dening |
| 7,132,891 | B1 | 11/2006 | Dening |
| 7,755,330 | B2 | 7/2010 | Formenti |
| 8,175,574 | B1 | 5/2012 | Panda |
| 8,575,896 | B2 | 11/2013 | Greening |
| 8,624,560 | B2 | 1/2014 | Ungar |
| 9,166,615 | B2 | 10/2015 | Kinyua |
| 9,438,054 | B2 | 9/2016 | Patel |
| 2003/0222615 | A1 | 12/2003 | Aono |
| 2004/0198277 | A1 | 10/2004 | Yuan |
| 2007/0123303 | A1 | 5/2007 | Book |
| 2007/0236201 | A1 | 10/2007 | Brown |
| 2008/0197811 | A1 | 8/2008 | Hartular |
| 2009/0259420 | A1 | 10/2009 | Greening |
| 2009/0273320 | A1 | 11/2009 | Ungar |
| 2009/0278506 | A1 | 11/2009 | Winger |
| 2010/0103013 | A1 | 4/2010 | Deval |
| 2010/0225272 | A1 | 9/2010 | Kirby |
| 2010/0244573 | A1 | 9/2010 | Karnick |
| 2010/0253276 | A1 | 10/2010 | Hung |
| 2011/0050164 | A1 | 3/2011 | Partovi |
| 2011/0121784 | A1* | 5/2011 | Yun .................... H01M 10/486 320/118 |
| 2011/0127951 | A1 | 6/2011 | Walley |
| 2011/0127953 | A1 | 6/2011 | Walley |
| 2011/0215752 | A1* | 9/2011 | Waters .................. H01M 10/46 320/101 |
| 2012/0159220 | A1 | 6/2012 | Winkler |
| 2012/0181991 | A1 | 7/2012 | Gofman |
| 2012/0256483 | A1 | 10/2012 | Nakashima |
| 2013/0049704 | A1 | 2/2013 | Andou |
| 2013/0069592 | A1* | 3/2013 | Bouman .................... H02J 7/00 320/109 |
| 2013/0157729 | A1 | 6/2013 | Tabe |
| 2013/0162200 | A1* | 6/2013 | Terry ...................... H02J 5/005 320/108 |
| 2013/0201316 | A1 | 8/2013 | Binder |
| 2013/0285605 | A1 | 10/2013 | Partovi |
| 2014/0070617 | A1 | 3/2014 | Detmers |
| 2014/0145679 | A1 | 5/2014 | Chen |
| 2014/0152234 | A1 | 6/2014 | Herrmann |
| 2014/0225558 | A1 | 8/2014 | Park |
| 2014/0327410 | A1 | 11/2014 | Patel |
| 2015/0022160 | A1 | 1/2015 | Greening |
| 2015/0165917 | A1* | 6/2015 | Robers ...................... B60L 3/12 320/109 |
| 2016/0006272 | A1* | 1/2016 | Greening .............. H02J 7/0008 320/162 |

FOREIGN PATENT DOCUMENTS

| | | |
|---|---|---|
| EP | 2595027 | 5/2013 |
| JP | S63124728 A | 5/1988 |
| WO | 2008133388 A1 | 11/2008 |

OTHER PUBLICATIONS

"Inner Workings of a Smart Battery," Battery University, Internet article @ http://batteryuniversity.com/learn/article/inner_workings_of_a_smart_battery.

"Single Cell Li-Ion and Li-Pol Battery Gas Gauge IC for Portable Applications (bqJUNIOR)," Texas Instruments, bq27000, bq27200, SLUS556D—Sep. 2004—Revised Mar. 2006, Internet document at: http://www.ti.com/lit/ds/symlink/bq27000.pdf.

Gunderson, David, "Designing Battery-Management Systems," Micro Power Electronics, EDN, Jan. 6, 2011, pp. 40-45.

* cited by examiner

SYSTEMS AND METHODS FOR SIMULTANEOUSLY CHARGING A BATTERY WITH MULTIPLE POWER SOURCES

CROSS-REFERENCE TO RELATED APPLICATION

This application is a continuation of U.S. patent application Ser. No. 15/083,917, filed Mar. 29, 2016, which claims priority to U.S. Provisional Application No. 62/305,344, filed Mar. 8, 2016, and is related in subject matter to the commonly-assigned co-pending U.S. patent application Ser. No. 14/323,961, the contents of which applications are entirely incorporated herein.

TECHNICAL FIELD

This disclosure relates generally to power management and battery charging systems. More particularly, an embodiment related to a battery charging system for simultaneously charging a battery with multiple power sources using a closed-loop charging servo is disclosed. Other embodiments are also described herein.

BACKGROUND

Many electronic devices today, especially portable electronic devices, use batteries for power when mains electricity or other traditional wired power sources are not available. In many instances, it would be desirable for such portable electronic devices to be able to simultaneously charge their battery (or batteries) using multiple different external (or internal) power sources. Such a system, for example, could include a laptop with both a traditional charging port, e.g., for charging the device from a wired power adapter, as well as multiple charge-capable ports, such as USB-C ports.

SUMMARY

In accordance with embodiments disclosed herein, a prioritized system for simultaneously charging a battery from multiple power sources is achieved. Instead of selecting a single power source as the input of a charger, each of the multiple power source may utilize its own power converter, and the outputs of all of the power converters and the battery may be directly connected to a common $V_{MAIN}$ system rail for powering the system load and/or charging the battery. A closed-loop servo, e.g., running on a microprocessor, may be utilized to coordinate among the multiple power sources and charge the battery in an efficient manner. According to some embodiments, the pass FET 140 and the charge FET 185, shown in the circuit topology of FIG. 1, may be combined into a single charge/pass FET that is controlled by a battery gauge in a battery pack of the electronic device. According to some embodiments, the battery gauge may also be responsible for system safety.

In accordance with an embodiment of the invention, closed-loop control of a battery charging process (in a battery charging system) is achieved by adjusting the voltage targets of the multiple power converters to control battery charging, based upon a known priority scheme and measurements taken by one or more sensors that are located in the battery and/or the multiple power converters.

According to some embodiments, a charging controller, e.g., implemented using a microprocessor, repeatedly determines or updates a servo target at a first frequency, in accordance with a feedback control loop algorithm (or process). The feedback control loop process may calculate error values, based on comparing a.) a desired and predetermined charging profile that specifies target values for one or more battery parameters, with b.) one or more of a present battery current, a present battery voltage, a present battery temperature, or an inferred metric, such as state of charge, lithium surface concentration, or the current divided by the battery capacity, which may be provided by the battery gauge and its sensors.

According to some embodiments, the target voltage of the highest priority power source may be set to the output of a proportional-integral-derivative (PID) controller, which output is also referred to herein as, $V_{SERVO}$. The target voltage of the second highest priority power source may then be set to the target voltage of the first priority power source target minus a fixed 'voltage difference' amount. The voltage difference amount may be determined by, e.g., the accuracies of the two power converters, with the voltage difference offset amount being set in order to make sure that the two voltage targets could never inadvertently overlap, given the accuracies of the power converters. By setting the different power converters to targets that are separated by more than the power converters' accuracies, the control servo simultaneously prioritizes the power converters—and prevents the power converters from fighting each other over control of the $V_{MAIN}$ voltage.

In systems with more than two power converters, the priority scheme may be implemented by continuing to set the voltage targets of the remaining power converters to have lower target voltages by 'cascading' the target voltages for each power converter to lower and lower values for each power converter in order of descending priority, e.g., by decreasing the voltage target of each power converter by an additional 'voltage difference' amount from the voltage target of the power converter having the immediately higher priority level. In some embodiments, the voltage difference amount may be determined by the margin of error for the respective power converters, which may fluctuate, e.g., with operating conditions such as voltage and/or temperature. In other embodiments, rather than being fixed, the 'voltage difference' amount may be different between different pairs of power converters with adjacent priority levels.

According to embodiments, the power source priority is not fixed to a specific power converter, and instead may change depending upon the characteristics of the power source. For instance, in a system with multiple charge-capable USB-C ports, the power source with the highest power capability may be selected as the highest priority converter, and which port that is would depend upon which USB-C port that the highest power capable power source is connected to.

In an embodiment, a method performed by a battery charging system includes measuring, by one or more sensors and/or sensor circuitry in a battery, at least one of a battery current, a battery voltage, a battery temperature, or an inferred metric such as state of charge or the battery current divided by the battery capacity of a battery pack or cell in the battery pack. The method may further include repeatedly updating, by a charging controller that is coupled with the one or more sensors, a variable servo target in accordance with a first feedback control loop process that is based on the measured battery side current, battery side voltage, battery side temperature, or inferred metric such as state of charge or the battery current divided by the battery capacity. Determining the servo target may include determining a profile voltage target and a profile current target for each of the multiple power converters, based on a predetermined or stored charging priority profile, and comparing the measured battery voltage to the profile voltage targets and/or comparing the measured battery current to the profile current targets to determine an error for each of the multiple power converters. The servo target may then be determined based on the determined errors for each of the multiple power converters, in accordance with the first feedback control loop process. The method may further include repeatedly adjusting, by a charging controller, one or more power conversion circuits that each produces output voltages on a power supply rail that is directly connected to a terminal of the battery pack and the system load, wherein the produced voltage is in accordance with the servo target, wherein the servo target may be based, at least in part, on the determined profile targets. The feedback control loop processes may include a PID control scheme having, for example, a non-zero integrator gain, and no requirements (other than stability) on the proportional or derivative gains, which may even be set to zero (or omitted).

In an embodiment, a battery charging system and method prevents integral 'windup' in the PID control scheme. The charger controller may be configured to provide a notification when any target other than the battery voltage rail is limiting the control of any of the multiple power converters. For example, a method may include determining whether any of the multiple power converters are limited by an input voltage of the power converter, an input current of the power converter, or a duty cycle of the power converter. When the input voltage, the input current, a die thermal limit, or the duty cycle is limiting each of the connected multiple power converters, the charging system may be configured to discontinue its repeated determining or updating of the servo target to prevent a so-called windup condition. If, on the other hand, at least one of the power converters is not so limited, the charging system may continue its repeated determining or updating of the servo target and target voltages.

Embodiments may also include non-transitory, computer-readable media having computer-readable instructions for controlling a battery charging process. For example, instructions may cause a battery charging system to implement the methods described above.

The above Summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above Summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness, a given figure may be used to illustrate the features of more than one embodiment of the invention, or more than one species of the invention, and not all elements in the figure may be required for a given embodiment or species.

DETAILED DESCRIPTION

Figure 1:
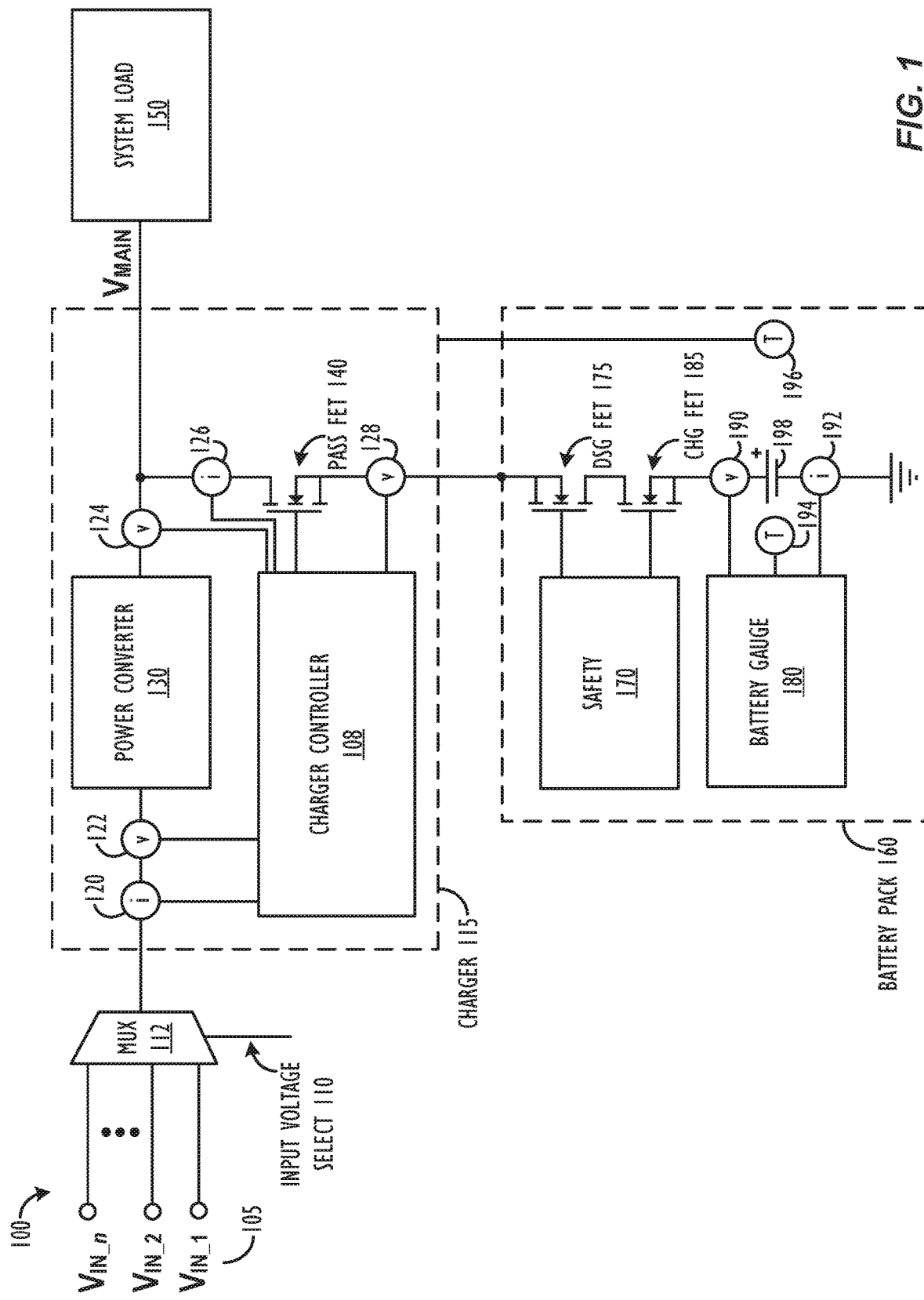
FIG. 1 is a schematic view of a standard multiple power source battery charging system.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

The embodiments described herein relate to battery charging systems for use in electronic devices powered by batteries. While some embodiments are described with specific regard to integration within portable electronic devices, the embodiments are not so limited, and certain embodiments may also be applicable to other uses. For example, one or more of the embodiments described below may be integrated within devices or apparatuses that are powered by batteries, regardless of whether the devices or apparatuses typically operate at a single location.

In various embodiments, description is made with reference to the Figures. However, certain embodiments may be practiced without one or more of these specific details, or in combination with other known methods and configurations. In the following description, numerous specific details are set forth, such as specific configurations, dimensions, and processes, in order to provide a thorough understanding of the embodiments. In other instances, well-known processes and manufacturing techniques have not been described in particular detail in order to not unnecessarily obscure the description. Furthermore, the particular features, structures, configurations, or characteristics may be combined in any suitable manner in one or more embodiments.

In an aspect, an embodiment of a battery charging system includes closed-loop control of a charging process based on measurements taken in a battery, e.g., by a battery gauge. A battery gauge may measure characteristics of a battery, e.g., cell current, cell voltage, and/or cell temperature, using sensor circuitry in the battery and provide those measurements to a controller. The controller may use these measurements, inferred metrics (e.g., state of charge or the battery current divided by the battery capacity to a battery controller), and/or charging profile information to determine a servo target and/or target voltages for each of multiple power converters being used to simultaneously charge the battery.

For example, the battery charger may implement a feedback control loop process based on a comparison between at least one target value of a charging profile and the received measurements to repeatedly update the servo target at a first rate. The servo target may be updated to drive an error signal between the received measurements and one or more target values of the charging profile, e.g., target voltage or target current, toward zero. In this way, the servo target may be used to control the charging of the battery to one or more target values, as determined by a charging profile.

According to some embodiments, a priority scheme may be employed, such that the power source with the highest priority provides as much power as it can, followed by the power supply having the second-highest priority, etc.—until all of the desired power is provided from among all of the multiple connected power sources. For example, if a servo controller sets a target charging voltage for the highest priority power source that it is unable to meet, the servo target (and, by extension, the target voltages of each of the multiple power sources) may be incrementally increased until one (or more) of the multiple power sources is able to begin providing a voltage at the desired level, such that the cell voltage measured by the battery gauge reaches the target charging voltage.

An exemplary circuit solution 100 to such a multiple power source battery charging system is shown in FIG. 1. The 'n' multiple power sources 105 are labeled as $V_{IN\_1}$ through $V_{IN\_n}$. The multiple power sources 105 could come from, e.g., multiple external connections to different direct current (DC) power sources (such as power supplies or external batteries), or a mixture of external connections to power sources and internal connections to power sources (such as wireless power receivers, solar panels, etc.). An input voltage selector, such as multiplexer 112 may choose, via input voltage select signal 110, one of the multiple power sources 105 to be connected to a single charger integrated circuit (IC) 115 responsible for charging the internal battery 198 (e.g., located in a battery pack 160 within the electronic device) and powering the system load 150 at a voltage level, $V_{MAIN}$. When no other external (or internal) power source is available, the charger 115 may then connect the internal battery 198 to $V_{MAIN}$ to power the system load 150.

A multiple power source battery charging system, such as is shown in FIG. 1, may be responsible for charging a battery from a DC power source, such as from a 5V USB connection. A charger IC, such as charger 115, may be comprised of a power converter 130, a charger controller 108, and a pass field effect transistor (FET) 140. The power converter 130 may be comprised of a linear regulator or switching power supply, such as a buck or boost converter, which is responsible for converting the input DC power from the selected power source 105 to power on the $V_{MAIN}$ rail. The power may be delivered through the pass FET 140, and charger 115 may control the pass FET 140 to adjust a voltage and current fed to battery 198 for charging.

A charger controller 108 may control power converter 130 to deliver power directly to system load 150 and to charge the battery pack 160, based on the various capabilities of power sources 105. Control by charger controller 108 is typically influenced by measurements provided to charger controller 108 by various sensors. More specifically, charger 115 generally measures current and voltage within the charger 115, i.e. within the same integrated circuit package, when delivering current to charge the battery 198. For example, charger 115 may include a charger current sensor 126 to measure the current that is delivered through the pass FET 140 to battery 198. Likewise, charger 115 may include a charger voltage sensor 128 to measure a battery rail voltage at the charger 115. Charger 115 may also comprise an input current sensor 120 and input voltage sensor 122, as well as a converter output voltage sensor 124 for measuring the voltage on the $V_{MAIN}$ rail. The input current 120 and input voltage 122 may be measured, e.g., to prevent too much power from being pulled from the power source, based upon its current limit and/or a maximum allowed voltage droop. The $V_{MAIN}$ voltage 124 may be measured to maintain the $V_{MAIN}$ voltage above a minimum voltage, e.g., when the battery voltage is low, or to control the $V_{MAIN}$ voltage when the battery 198 is full. Charger 115 may also take measurements of battery temperature, e.g., with temperature sensor 196. The battery current 126, battery voltage 128, and battery temperature 196 measurements may also be used to control temperature-dependent current and voltage limits for battery charging.

The pass FET 140 typically has three responsibilities:

1. When charging is complete and the battery is full, the pass FET 140 may be disabled to prevent further charge from entering the battery 198, while the power converter 130 continues to supply power to the system load 150 via the $V_{MAIN}$ rail.

2. Charging systems typically have a minimum $V_{MAIN}$ system voltage needed to run the electronic device that is higher than the minimum battery voltage. If the battery voltage drops lower than the minimum $V_{MAIN}$ system voltage, then the charger 115 may control the power converter 130 to maintain the $V_{MAIN}$ voltage above the minimum system voltage, while linearly controlling the pass FET 140 to charge the battery 198 at a lower voltage.

3. The pass FET 140 is typically designed with a FET mirror technique in order to measure the current 126 flowing into the battery for control purposes. In other embodiments, an external sense resistor may be used to measure the battery current 126.

The system may also include a battery gauge 180 that is located remotely, e.g., in battery pack 160. The battery gauge 180 may use battery sensors that may be integrated directly at one or more battery cells 198 to sense battery operating parameters. These parameters may include sensed battery voltage 190, battery current 192, and battery temperature 194. These measurements are then typically used to infer battery characteristics, such as state of charge, impedance, capacity, time left until fully discharged, etc. More specifically, the measurements made by the battery gauge are typically relied upon to report system characteristics to a user, e.g., through a display icon indicating a state of charge of battery pack 160.

The charger measurements (120/122/124/126/128/196) are typically independent from the battery gauge measurements of voltage (190), current (192), and temperature (194), as shown in FIG. 1. The measurements by the battery gauge 180 are used to measure the state of charge and capacity of the battery and are not typically used to control charging. In addition to gauging the battery, the battery circuitry may also comprise safety circuitry 170 that is responsible for ensuring the battery is operated safely, with control of a charge FET 185 and discharge FET 175 that, when disabled, prevent charging and discharging of the battery 198, respectively. The battery gauge 180 and safety circuitry 170 within the battery pack 160 are often implemented as independent circuits, as shown in FIG. 1.

One issue with the multiple power source battery charging circuit solution, e.g., as depicted in FIG. 1, is that the system must choose which power source 105 to use to power the system load 150 and/or charge the battery 198. If the chosen power source is not strong enough to provide all of the power for the system load and charge the battery, then the battery will charge more slowly than desired—and possibly even discharge, in order to provide the needed power to the system load.

Thus, what is desirable is a system that can simultaneously pull power from more than one—or even all—of the available power sources according to a charging priority scheme, such that the power source with the highest priority provides as much power as it can, followed by the power supply having the second-highest priority, etc.—until all of the desired power is provided from among all of the multiple connected power sources.

Figure 2:
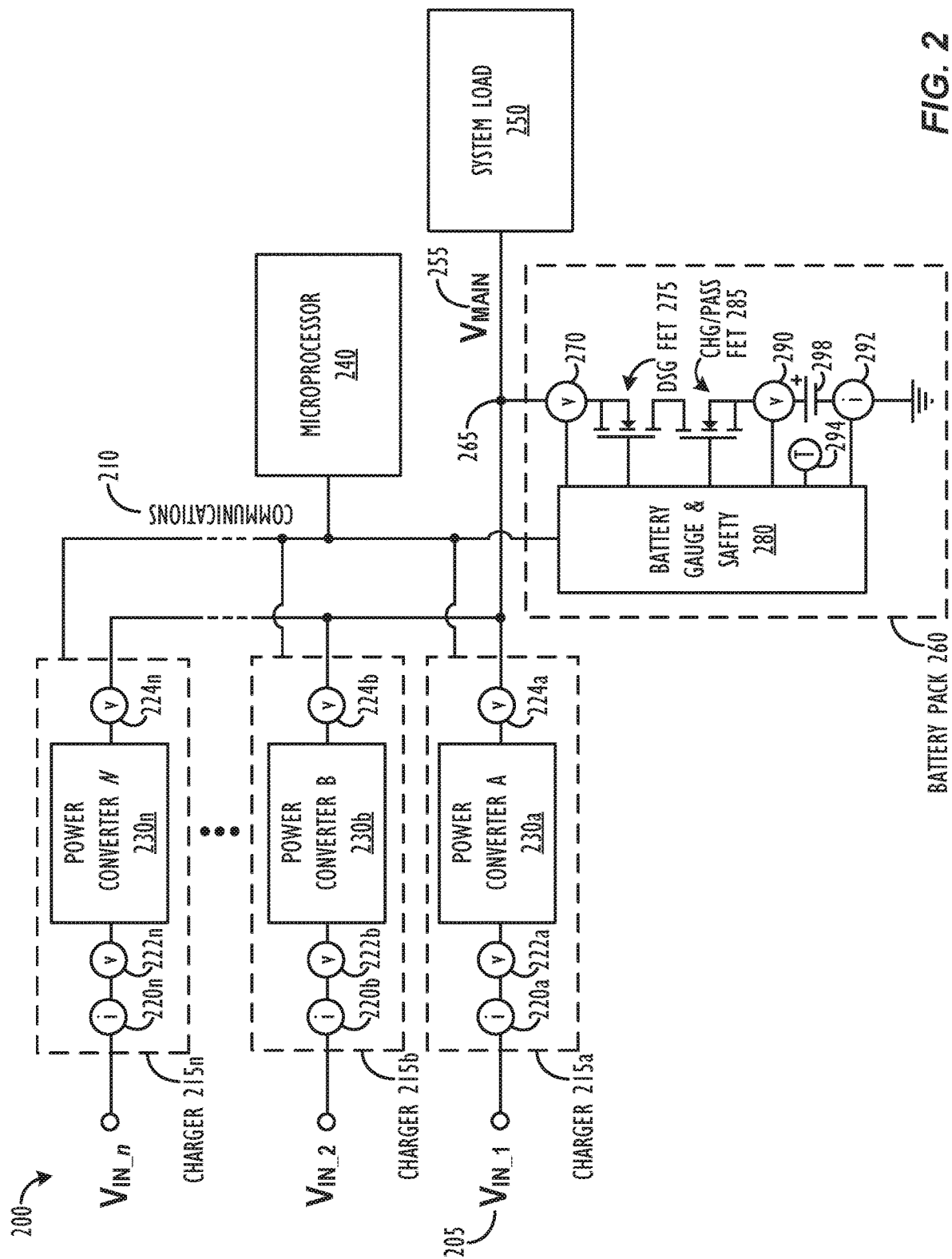
FIG. 2 is a schematic view of a multiple power source battery charging system having a charger in communication with a battery, in accordance with one or more embodiments.

Turning now to FIG. 2, a schematic view 200 of a multiple power source battery charging system having chargers in communication with a battery is shown, in accordance with one or more embodiments. More particularly, the circuit topology of FIG. 2 provides a prioritized system for simultaneously charging a single battery 298 from multiple power sources 205. Instead of selecting a single power source as the input of a charger, each power source 205, labeled as $V_{IN\_1}$ through $V_{IN\_n}$, has its own "charger" 215, labeled as 215$_a$ through 215$_n$, comprising an individual power converter 230, labeled as 230$_a$ through 230$_n$, and associated current and voltage measurement circuitry 220$_n$/222$_n$/224$_n$, and the outputs of all of the power converters 230a-230n and the battery pack 260 are connected to a common $V_{MAIN}$ system rail 255. A closed-loop servo running on a processor, shown as microprocessor 240 in FIG. 2, may be responsible for coordinating the power sources and charging the battery, e.g., over communications interface 210. The pass FET 140 and the charge FET 185 in the standard circuit topology shown in FIG. 1 are combined into a single charge/pass FET 285 in the embodiment illustrated in FIG. 2, which may be controlled by the combined battery gauge and safety circuit 280.

As described with reference to FIG. 1, battery pack 260 may also use battery sensors that may be integrated directly at one or more battery cells 298 to sense battery operating parameters. These parameters may include sensed battery voltage 290, battery current 292, and battery temperature 294. These measurements are then typically used to infer battery characteristics, such as state of charge, impedance, capacity, time left until fully discharged, etc. Battery pack 260 may also comprise a voltage sensor 270, which may report the voltage at node 265, i.e., the common $V_{MAIN}$ system rail 255 to which the battery pack 260 and each of the power converters 230a-230n are connected.

As mentioned above, the circuit topology of FIG. 2 enables multiple power sources to simultaneously charge a single battery. The basic premise of a closed-loop servo, such as that running on microprocessor 240, is that the voltage target of the charger may be adjusted based upon measurements from the battery gauge and a desired charging profile. The battery voltage and current are correlated by the impedance of the battery, which does not change quickly. As a consequence, a constant charging current can be controlled by comparing the battery gauge's measurement of the current to a target current and adjusting the charger's voltage target at a manageable servo rate, e.g., at a rate of 1 Hz, without needing a circuit that directly controls the battery current.

The '961 application describes in further detail how the closed-loop servo may run in a microprocessor that reads measurements from the battery gauge and sets a target voltage in the charger, referred to as $V_{SERVO}$. According to the '961 application, to prevent servo windup, if the single power converter cannot control its output voltage to the target voltage, the charger must inform the servo that it is limited (e.g., by an input current limit), and the servo responds by holding the target voltage to the same level. To reduce quantization noise, the precision of the charger output voltage is typically designed to be a few millivolts (mV) or better. Only precision is required, as accuracy is provided by the accurate voltage and current measurements of the battery gauge. The charger should also be designed with a minimum output impedance, often called 'zero load line,' as the target voltage should be controlled within the high bandwidth of the charger and not depend upon loads of the system.

The '961 application also describes how a closed-loop charging servo combined with a battery gauge that directly controls the charge and discharge FETs can eliminate the need for the pass FET typically needed in the traditional charger, shown in FIG. 1, without eliminating the three pass FET responsibilities outlined above:

1. When charging is complete and the battery is full, the battery gauge 280 disables its charge FET, shown as the CHG/Pass FET 285 in FIG. 2, instead of the charger's pass FET 140 in FIG. 1, allowing the power converter to continue to provide power to the $V_{MAIN}$ system rail 255. [A discharge FET, shown as the DSG FET 275 in FIG. 2 may play a similar role to the discharge FET 175 shown in FIG. 1, i.e., allowing or preventing the discharging of the battery pack 260 depending on whether or not it is enabled.]

2. The power converter maintains the $V_{MAIN}$ system rail 255 above the minimum system voltage, while the battery gauge 280 controls the CHG/Pass FET 285 linearly to provide power to the battery 298 at a voltage that is lower than the $V_{MAIN}$ voltage. The battery gauge 280 may require a high bandwidth servo controlling the gate of the CHG/Pass FET 285 to control the battery voltage, while simultaneously not allowing the $V_{MAIN}$ voltage to droop below a set level, thereby prioritizing the power to the system load 250 over charging the battery 298.

3. The closed-loop servo can control the current into the battery 298 by using the gauge's 280 measurement of the current in the battery 292 and adjusting the power converters' target voltages, thus eliminating the need for a traditional pass FET 140 in the charger that can measure or control the battery current. According to some embodiments, the battery gauge 280 may also assume the responsibilities of the safety integrated circuit, shown at element 170 in FIG. 1, thus eliminating the need for a separate safety IC.

Figure 3:
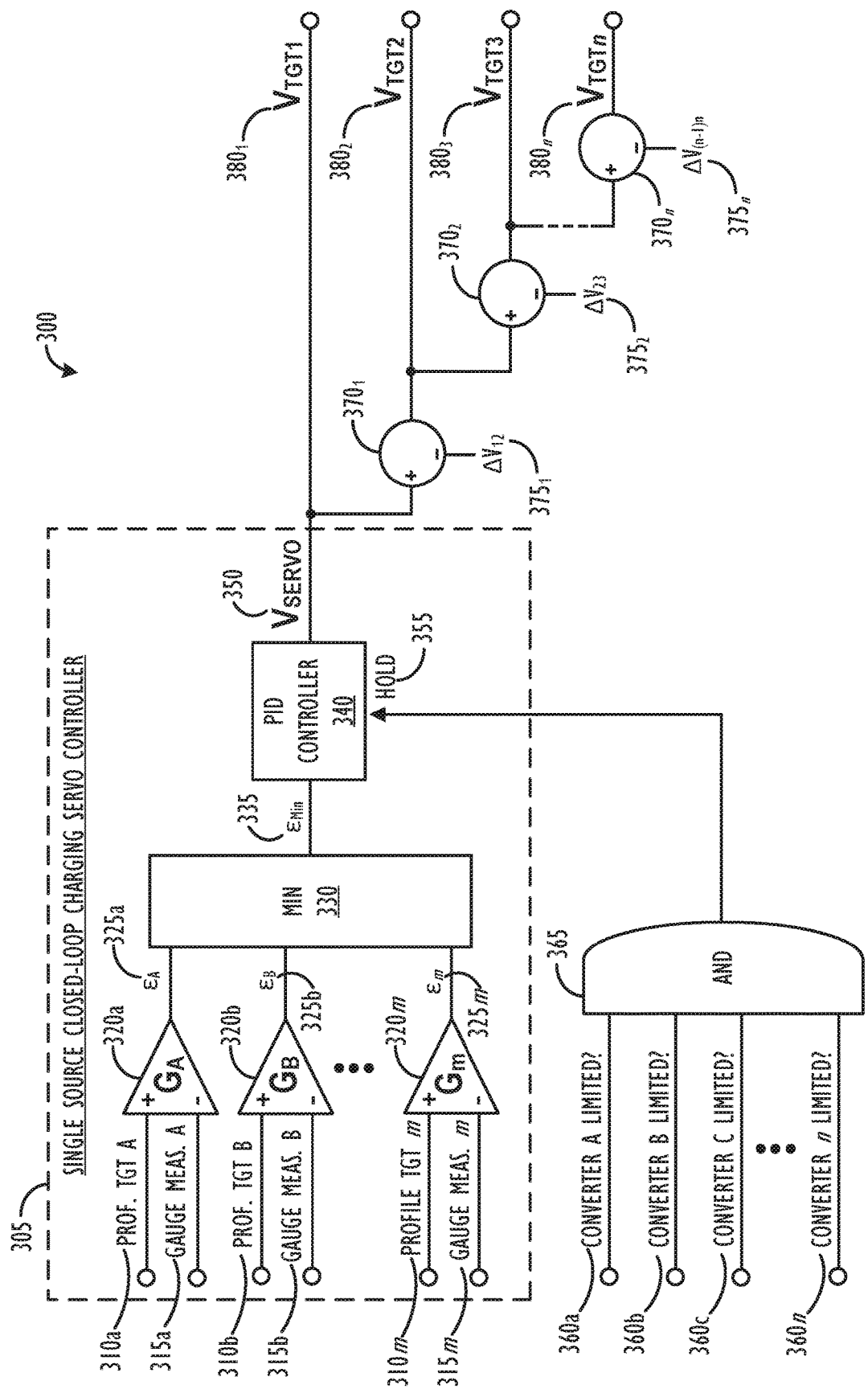
FIG. 3 is a schematic view of a closed-loop charging servo controller for a multiple power source battery charging system, in accordance with one or more embodiments.

Turning now to FIG. 3, a schematic view 300 of a closed-loop charging servo controller for a multiple power source battery charging system is shown, in accordance with one or more embodiments. The feedback control system required for the topology shown in FIG. 3 is similar to that described in the '961 application, but, rather than controlling a single charger voltage target value, the system shown in FIG. 3 sets the target voltage values for each of a plurality of power converters, according to determined priority levels. The dashed line box 305 labeled, "Single Source Closed-Loop Charging Servo Controller," contains the components that may be used to control the output of the PID controller 340, which may be used to set the target value for the highest priority power converter. For example, components 310/315/320/325 may be used to measure and compare each battery parameter that the system may be attempting to control. For instance, the battery parameter associated with profile target value A (310a) might be a current profile target value, the battery parameter associated with profile target value B (310b) might be a voltage profile target value, and the battery parameter associated with profile target value M (310m) might be a power dissipation profile target value for the charge FET. The minimum circuit 330 ensures that the most limiting parameter controls the PID controller 340's servo output value. For example, if the current profile target value is 1.0 amp, the voltage profile target value is 4.0V, and the maximum charge FET power dissipation profile target value is 0.5 W, then the PID controller 340 will select (through the min circuit 330) only the dominant attribute to control the servo output value. If the current profile target value dominates, for example, then the PID controller 340 may adjust the main voltage ($V_{SERVO}$ 350) to keep the current at 1.0 A. In this hypothetical example, the voltage would be less than 4.0V and the charge FET power would be less than 0.5 W.

As mentioned above, the inputs to the control servo are various profile target values 310 and measurements from the battery gauge 315. A typical profile target value may be a current or voltage limit, and the corresponding measurement may be the current or voltage measured by the gauge. The difference between the profile target 310 and the gauge measurement 315, sometimes multiplied by a gain Gm 320, forms an error term $\varepsilon_m$ 325, which is defined as positive if the measurement is within bounds, i.e., less than the profile target value. A minimum of all of the separate error terms, shown as $\varepsilon_{Min}$ 335 in FIG. 3, may be calculated by a minimum circuit 330, and is then used as the input error to a standard PID controller 340. The PID controller 340 may then adjust its output, $V_{SERVO}$ 350, in order to servo the input error $\varepsilon_{min}$ to zero.

In a single power source system, such as is described in the '961 application, the feedback control loop may comprise a PID controller having an output, $V_{SERVO}$, that is the target set point value for the power converter, or $V_{MAIN}$ voltage. If the power converter is limited by something other than the output voltage, such as the input current limit, then the power converter would indicate that it was limited, and the PID servo controller would be paused and hold its output value to prevent servo windup.

In a feedback control loop for a multiple power source battery charging system, such as is disclosed herein, by contrast, the target voltage of the highest priority power source, $V_{TGT1}$ (380$_1$), may be set to the output of the PID controller 340, i.e., $V_{SERVO}$ 350. Then, the target voltage of the second highest priority power source $V_{TGT2}$ (380$_2$) could be set to the target voltage of the first priority power source, $V_{TGT1}$ (380$_1$), target minus a fixed voltage difference, $\Delta V_{12}$ (375$_1$), wherein the size of the voltage difference may be determined by the accuracies of the two power converters and may be implemented using a simple subtractor circuit (370$_1$). This method may be extended, as shown in FIG. 3, depending upon the number of power sources 205, so, for instance, the target voltage of a third priority power source, $V_{TGT3}$ (380$_3$), could be set to the target voltage of second priority power source, $V_{TGT2}$ (380$_2$), minus a fixed voltage difference, $\Delta V_{23}$ (375$_2$), and so on, for each of the power sources being utilized.

The fixed voltage difference between power converters, such as $\Delta V_{12}$ (375$_1$), may be determined by the accuracy of each power converter to make sure that the two voltage targets could never overlap, given the accuracies of the power converters, and thus accidently invert the desired respective priority levels of the power converters. By setting the different power converters to targets that are separated by more than the power converters' respective accuracies, the control servo may simultaneously prioritize the power converters and prevent the power converters from fighting each other over control of the $V_{MAIN}$ voltage.

In some embodiments, the various power sources may be controlled by something other than output voltage targets, e.g., a current target, a power target, or a combination thereof may be used. With other types of power sources, e.g., fuel cells, the target value may be related an oxygen level or throttle level, rather than a voltage or current target, as well. However, as long as the output targets of the various multiple power converters are able to be set by the system in a controlled, e.g., mathematical, manner, the system may be able to enforce its desired priority scheme, according to the methods disclosed herein, using control schemes other than the particular 'fixed voltage difference' scheme described above.

Note that the power source priority target number (e.g., 1 for first priority, 2 for second priority, 3 for third priority, etc.) is not necessarily fixed to a specific power converter (e.g., Power Converter A, Power Converter B, Power Converter C), but instead may change depending upon the characteristics of the power source. For instance, in a system with multiple charge-capable USB-C ports, the power source with the highest power capability (e.g., an AC-DC adapter that plugs into a wall power outlet) may be selected as the highest priority power source (i.e., priority number 1), but which power converter that highest priority power source corresponded to (e.g., Power Converter A, or B, or C, etc.) would depend upon which USB-C port that it was connected to. According to some embodiments, information and/or characteristics allowing the system to determine the relative priorities of the various power source may be obtained via an enumeration protocol when the power source is connected. Any desired prioritization scheme may be employed, e.g., prioritizing higher power output capability over lower power output capability, prioritizing wired power sources over batteries, prioritizing power sources that come from 'clean' energy source over power sources that come from 'dirty' energy source, etc., or some combination (s) thereof.

To better understand the control, an exemplary system with two power converters, referred to herein as Power Converter A and Power Converter B, will be described in greater detail. If the target of the PID controller that servos the minimum error signal $\varepsilon_{min}$ to zero were to be 4.0V, and the minimum voltage difference amount of $\Delta V_{12}$ (375$_1$) was set to 50 mV, then the target voltage, $V_{TGT1}$ (380$_1$), of the highest priority power converter, i.e., Power Converter A in this example, would be set to 4.0V, and the target voltage, $V_{TGT2}$ (380$_2$), of the other power converter, i.e., Power Converter B in this example, would be set to 3.95V (i.e., 4.0V minus the minimum voltage difference amount of 50 mV).

Power Converter A, as the highest priority converter in this scenario, would provide all of the power to $V_{MAIN}$ for the system and charging the battery as long as it is able to hold 4.0V at its output. The second priority power converter, Power Converter B in this example, would provide no power to the output because the output voltage at 4.0V is higher than the power converter's target of 3.95 V. To prevent power converters from 'fighting' over which one provides power, in some embodiments, the power converters used in this topology are configured to be able to actively increase the $V_{MAIN}$ voltage by increasing their output power, but are not allowed to pull power from the output to lower the $V_{MAIN}$ voltage. If the power converters are implemented as DC-DC switching supplies such as a buck converter, for example, then this constraint implies that the buck converter allows power to move in one direction only. According to some embodiments, the uni-directional power delivery may be implemented by operating the converter in a discontinuous conduction mode (DCM). Operating in DCM mode also allows lower priority power converters to be turned off when they are unneeded, e.g., when the target value for a particular power converter is lower than the actual $V_{MAIN}$ voltage. By contrast, a bi-directional switcher connected to an external battery may not be required to have a DCM mode, and would look like a system load while charging the external battery, but would instead look like a power source when it was either the only power source being used or was supplementing the higher priority power sources.

If the power source connected to Power Converter A in this example is no longer able to control $V_{MAIN}$ to 4.0 V for some reason, then the $V_{MAIN}$ voltage would droop until it reached 3.95V, at which point Power Converter B, which had been designated as the second-highest priority power converter in this example, would start supplementing the power and maintain $V_{MAIN}$ at 3.95V. If the $V_{MAIN}$ voltage were to droop down to 3.95V, however, the closed-loop servo would tend to increase the output target to compensate for the offset, thus increasing the $V_{SERVO}$ value to 4.05V to restore the minimum error signal $\varepsilon_{min}$ to zero. The highest priority power converter would therefore have its voltage target set to 4.05V, and second priority power converter's voltage target would be set to 4.0V, with the second priority power converter in control and the highest priority power converter unable to control its output to 4.05V due to some limitation, such as an input current limit. To successfully servo out any offset, the PID controller may be configured to have a non-zero integrator gain, but not necessarily have any other requirements (other than stability) with respect to its proportional or derivative gains, which may even be set to zero or omitted.

In a single power source system such as described in the '961 application, the PID controller output may be held to prevent windup if the single charger is limited by something other than the output voltage. In a multiple power source system, according to some embodiments described herein, the PID controller 340 may be held (e.g., by a logical high signal on "HOLD" line 355) only if every power converter is limited by something other than their output voltage (i.e., a logical high on each of the "CONVERTER n LIMITED?" lines 360a-360n), as implemented by the "AND" gate 365 in FIG. 3 that reports a logical high signal only if each of lines 360a-360n are reporting logical high signals, indicating that they are limited. By holding the voltage targets in such a situation, the current into the battery will exponentially decay until one of the power sources is no longer limited and capable of controlling its output to the target voltage, causing a logical low signal on "HOLD" line 355 and thus re-enabling the PID servo 340.

Figure 4A:
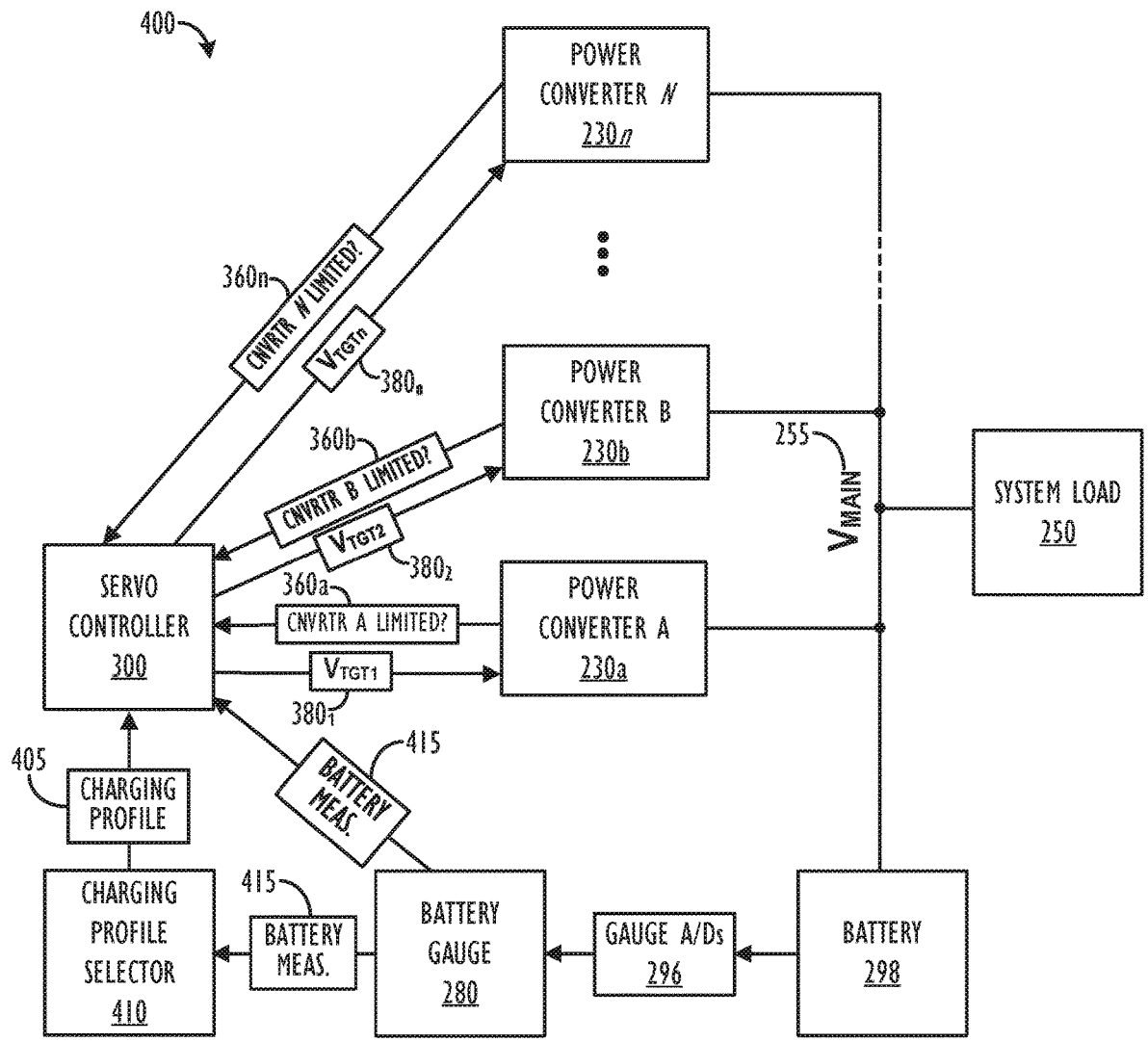
FIG. 4A is a block diagram illustrating a control scheme for a multiple power source closed-loop battery charging system, in accordance with one or more embodiments.

Turning now to FIG. 4A, a block diagram 400 illustrating a control scheme for a multiple power source closed-loop battery charging system is shown, in accordance with one or more embodiments. As shown in FIG. 4A, the servo controller 300 obtains the charging profile target values 405 from the charging profile selector 410, which may be located externally as a separate entity, within the battery gauge 280, or within the servo controller 300. The servo controller 300 may also receive battery measurements 415 directly from the battery gauge 280, in addition to information indicative of whether each power converter is limited by something other than the output voltage target 360a-360n. If at least one of the power converters is not limited, then the servo controller 300 may use a PID controller 340 to determine a target voltage 380 for each power converter 230, as shown in FIG. 3. The determined target voltages 380 may be updated at a chosen interval, e.g., once a second, or, 1 Hz. If all of the power converters 230 are limited (i.e., a logical high on each of the "CONVERTER n LIMITED?" lines 360a-360n), then the PID controller output may remain frozen, and the target voltages 380 for each power converter 230 may remain unchanged.

According to some embodiments, the power converters 230 attempt to control their output voltages to their respective target voltages without permitting current to flow in reverse, i.e., acting as uni-directional power sources. As mentioned with respect to FIG. 2, all of the voltage outputs of the power converters 230 may be connected together to a $V_{MAIN}$ power rail 255 that is connected to the system load 250 and to the battery pack 260. The control loop is thus 'closed,' with the battery 298 using various gauge A/Ds 296 to send relevant voltage, current, and temperature readings to battery gauge 280, which may then forward the measurements 415 to allow the charging profile selector 410 to update the charging profile 405 and/or the servo controller 300 to update its measurements, if necessary. As shown in FIG. 4A, Power Converter A 230a is identified as the highest priority power source (and thus tied to $V_{TGT1}$ 380$_1$) and power converter B 230b is identified as the second-highest priority power source (and thus tied to $V_{TGT2}$ 380$_2$). As will be illustrated with respect to FIG. 4B, according to some embodiments, this priority level is not fixed per power converter, and may instead by altered or determined on-the-fly and/or as necessary as different power sources are connected to the system or various operating conditions change.

Figure 4B:
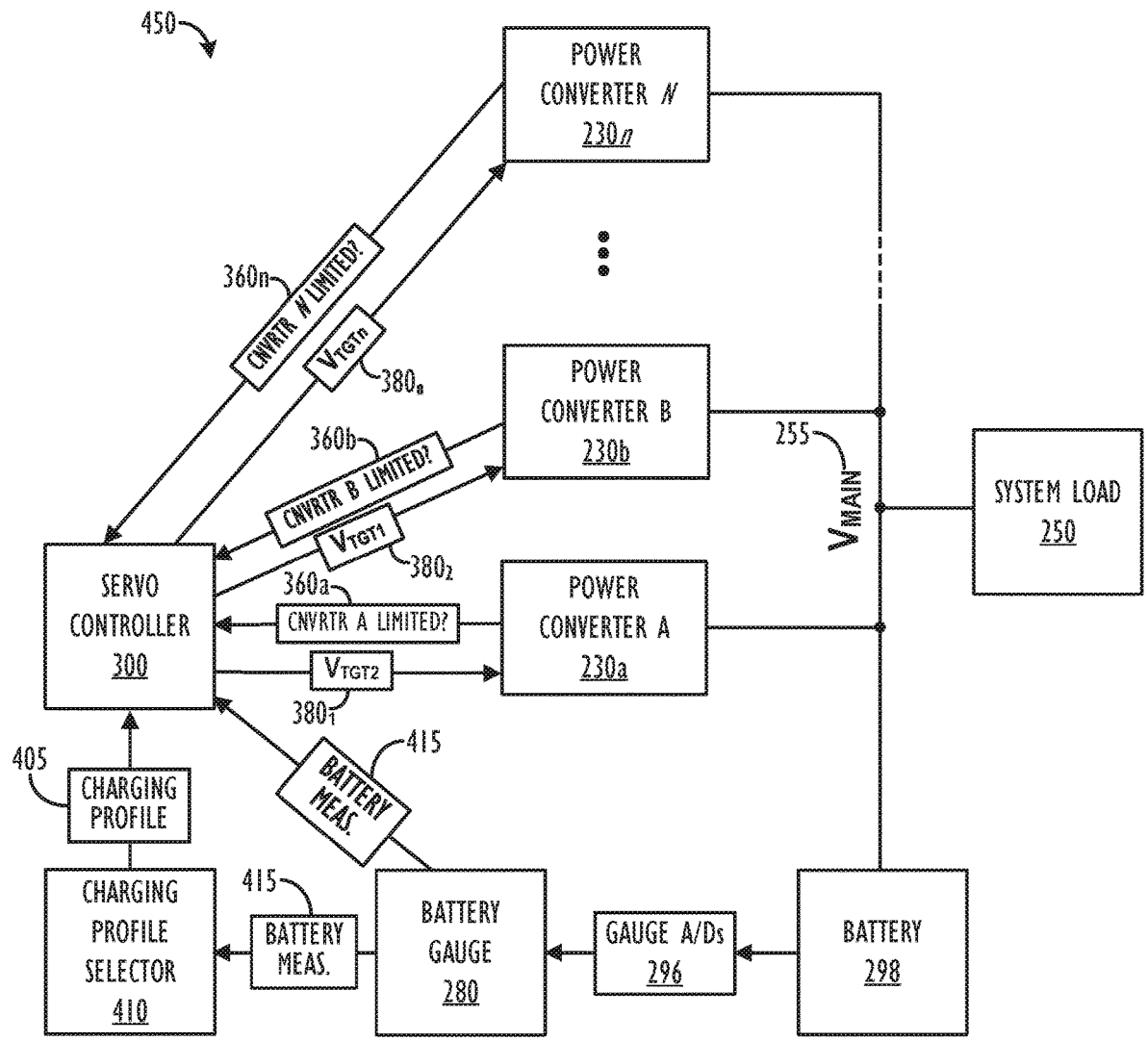
FIG. 4B is a block diagram illustrating a control scheme for a multiple power source closed-loop battery charging system, in accordance with one or more embodiments.

Turning now to FIG. 4B, a block diagram 450 illustrating a control scheme for a multiple power source closed-loop battery charging system is shown, in accordance with one or more embodiments. As mentioned above, FIG. 4B illustrates the point that, according to some embodiments, the priorities of the power converters are not necessarily fixed. In particular, compared to FIG. 4A, wherein Power Converter A 230a was the highest priority power source (and thus tied to $V_{TGT1}$ 380$_1$) and Power Converter B 230b was the second-highest priority power source (and thus tied to $V_{TGT2}$ 380$_2$), the situation is reversed in FIG. 4B. Thus, as shown in FIG. 4B, Power Converter B 230b is now deemed the highest priority power source according to the charging profile (and thus tied to $V_{TGT1}$ 380$_1$), and Power Converter A 230a is the second-highest priority power source (and thus tied to $V_{TGT2}$ 380$_2$).

In other embodiments, the system may effectively use default priority levels for the initial priority levels of the power converters. In such embodiments, the system may still determine and assign 'true' priorities to the converters once the power sources are plugged in and then enforce those 'true' priorities, e.g., by utilizing appropriate offsets for each of the $\Delta V_{(n-1)n}$ (375$_n$) values applied to the voltage targets for each converter. For example, the system may use negative offsets for one or more $\Delta V_{(n-1)n}$ (375$_n$) values in order to 'force' the converters to have target voltages that reflect the 'true' priorities that the system desires to enforce. In this way, the system may reorder the priorities of the various converters without actually having to reconfigure the connections between the various power converters and the PID controller 340.

Figure 5:
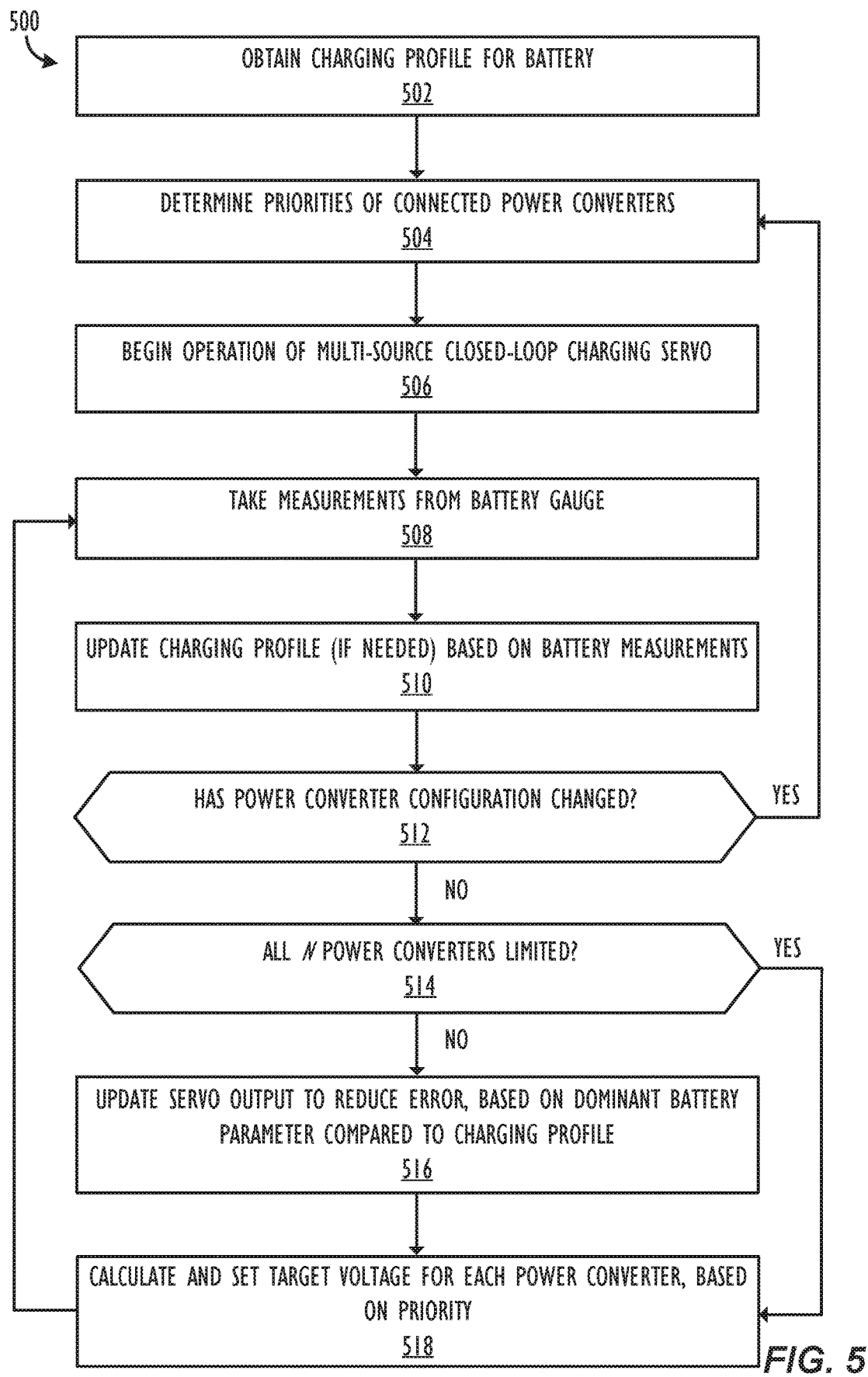
FIG. 5 is a flowchart illustrating a method for operating a multiple power source closed-loop battery charging system, in accordance with one or more embodiments.

Turning now to FIG. 5, a flowchart 500 illustrating a method for operating a multiple power source closed-loop battery charging system is shown, in accordance with one or more embodiments. First, at Block 502, the method may obtain a charging profile for a battery that is to be charged. The charging profile may specify how to charge the battery, while the individual power converters advertise how much power they can provide. The priorites of the power converters may then be set according to this information. According to some embodiments, a power source's priority level may be directly correlated to the target output voltage that will be set for the power converter that the power source is coupled to. For example, the power converter connected to the power source that is identified as having the highest priority will have the highest target output voltage, the power converter connected to the power source that is identified as having the second-highest priority will have the second-highest target output voltage, etc., and the power converter connected to the power source that is identified as having the lowest priority will have the lowest target output voltage.

Next, the method 500 may determine a priority level for each of the n power converters connected to the n power sources (Block 504). Next, the process may begin the operation of the multiple power source closed-loop charging servo (Block 506). As mentioned above with reference to FIG. 3, the charging servo may operate by taking measurements from a battery gauge (Block 508). Next, the method 500 may update the charging profile for the battery (if needed), based on the battery measurements, e.g., the state of charge of the battery or the temperature of the battery (Block 510). Next, the method 500 may determine if the power converter configuration has changed, e.g., if power sources have been added or removed, or if certain power sources have been connected to different power converters (Block 512). If the power converter configuration has changed, the method 500 may return to Block 504 to re-determine the priorities of the connected power converters. If, instead, at Block 512 the power converter configuration has not changed, the method 500 may proceed to receive indications of whether or not each of the n power converters are limited by something other than the output voltage (Block 514). If, at Block 514, each of the n power converters are limited by something other than the output voltage, the method 500 may proceed to Block 518, where the servo may calculate and set the target 'cascaded' target voltages for each of the n power converters (e.g., based on priority), before then returning to Block 508 to continue to take measurements from the battery gauge at a determined time interval to determine whether subsequent adjustments to the servo target will be needed. If, instead, at Block 514, each of the n power converters are not limited by something other than the output voltage, the method 500 may proceed to Block 516, where the servo may update its target, $V_{SERVO}$, based, at least in part, on a minimum error term of the dominant battery parameter as compared to the battery's charging profile, before then proceeding to Block 518 to calculate and set the target 'cascaded' target voltages for each of the n power converters (e.g., based on priority).

Another advantage of the multiple power source battery charging designs disclosed herein involves an embodiment wherein one or more of the power sources are external batteries. With a bi-directional power converter, an external battery can behave bi-directionally, i.e., it can be charged from other power sources if power is available, and otherwise can provide power to the system if needed. In such embodiments, the bi-directional power converter may act as the charger for the external battery, e.g., controlled by a similar closed-loop charging servo, with the external battery designated as a low priority power source. If the other power sources, i.e., the higher priority power sources, were to become disconnected or were unable to provide all of the power necessary to the system (including charging the internal battery and the external battery), then the external battery power source could 'reverse' and act as a power source, supplementing the other power sources. When using the traditional or standard battery-charging architecture, e.g. as shown in FIG. 1, an external battery must alternate between being either a power source or a power drain, but it cannot be designed to supplement other external power supplies under heavy loads, as is possible with the embodiments described herein.

By designing a multiple power source battery charger design with all inputs connected together at $V_{MAIN}$ (e.g., as shown at element 255 in FIG. 2), the system may simultaneously pull power from all of the available power sources—with a priority determined by the system. This represents an improvement over current standard designs, e.g., as shown in FIG. 1, which must select a single power source input at a time to be used to power the system and/or charge the internal battery. Another advantage of the embodiments disclosed herein is that some power sources, such as an external battery, could behave in a bi-directional manner, whereby they may be charged from another power source if power is available, and may otherwise provide power to the system if or when needed.

Figure 6:
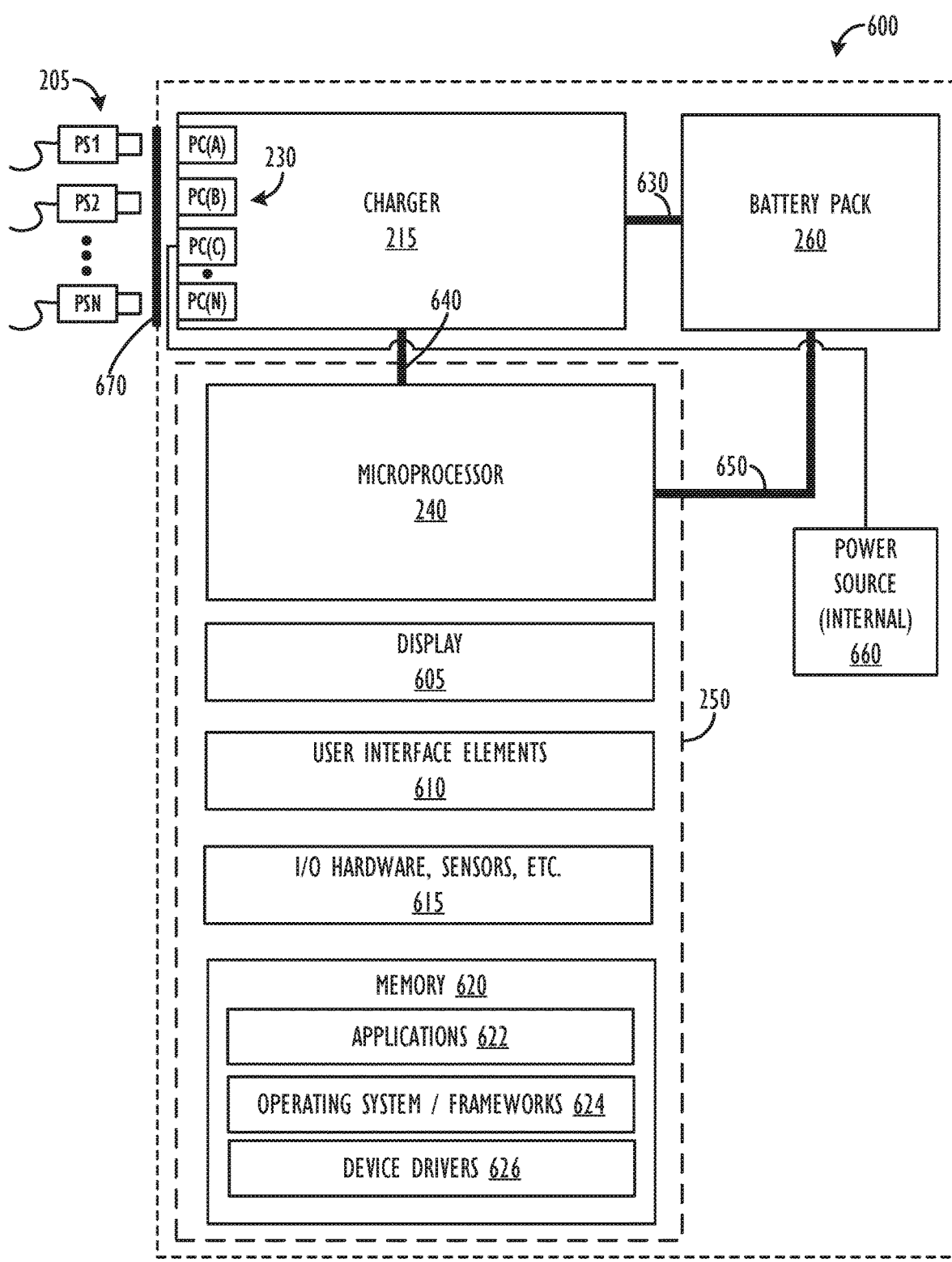
FIG. 6 is a schematic view of an electronic device having a multiple power source closed-loop battery charging system, in accordance with one or more embodiments.

Turning now to FIG. 6, a schematic view of an electronic device 600 having a multiple power source closed-loop battery charging system is shown, in accordance with one or more embodiments. Electronic device 600 may be one of several types of portable or stationary devices or apparatuses with circuitry suited to specific functionality, and thus, the circuitry diagrammed in FIG. 6 is provided by way of example and not limitation. Electronic device 600 may include a microprocessor 240 that executes instructions to carry out the different functions and capabilities described above. The instructions may be retrieved from local memory 620, and may be in the form of an operating system program 624 having device drivers 622, as well as one or more application programs 622 that run on top of the operating system, to perform any of various functions, e.g., telephony, e-mail, text messaging, media applications, and/or Internet browsing.

Electronic device 600 may have battery pack 260 integrated within an external housing, and battery pack 260 may be connected to charger 215 through connector 630. Charger 215 may be connected to a peripheral interface connector 670 that allows connections with separate power supplies 205 (labeled as PS1 through PSN), e.g., an AC wall power adapter, a USB-C compatible power source, an external battery, a solar panel, a fuel cell, or other green energy power source, for example. According to some embodiments, each power source 205 may be connected to its own power converter 230, each of which, as described above, may be connected to the other power converters and the internal battery pack 260 on a common $V_{MAIN}$ system rail.

In the example shown in FIG. 6, the index of the various power sources, e.g., 1, 2, 3, etc. reflects the relative priority level of each power source, i.e., PS1 represents the highest priority power source, PS2 represents the second-highest priority power source, etc. As shown in FIG. 6, PS1 will be connected to Power Converter A, i.e., PC(A). As such, PC(A) will be assigned the highest target voltage. Likewise, PS2 will be connected to Power Converter B, i.e., PC(B), so PC(B) will be assigned the second-highest target voltage. As mentioned above, these priority assignments are not fixed. Thus, if the lowest priority power source were later to be connected to Power Converter A, Power Converter A would be assigned the lowest target voltage. In other words, when power sources are coupled to device 600, a charging profile may assign priorities to each of the various power converters that the power sources have been connected to, and then the device may connect the appropriate converter to the appropriate target output voltage. In this way, the system maintains flexibility and does not require that certain power sources always be connected to certain power converters, nor does it require that the priority level of the power sources remain fixed over time.

Also shown in electronic device 600 is an internal power source 660, shown as being connected to Power Converter C, PC(C). Internal power source 660 represents any number of potential power sources that could be located internal to electronic device 600, e.g., wireless power receivers, inductive charging coils, solar panels, fuel cells, etc. Internal power sources 660 could effectively be seamlessly intermixed with external power sources 205, so long as an appropriate priority level for the internal power source(s) could be assigned in conjunction with the one or more external power sources also potentially being utilized to charge the electronic device 600's internal battery.

Charger 215 may be connected to microprocessor 240 via connector 640, comprising, e.g., wiring or a bus. In an embodiment, microprocessor 240 controls the charger 215 by setting the various voltage targets for power converters 230, as described in detail above. In an embodiment, microprocessor 240 may also be in communication with battery pack 260, such that battery pack 260 may communicate battery measurements to microprocessor 240, upon which the aforementioned servo target and power converter target voltage levels may be set.

Power supplied from the multiple power sources 205/660 to charge internal battery pack 260 and/or power system load 250 may be used to power the various components of electronic device 600 shown in the block diagram, e.g., display 605, user interface element 610, input/output (I/O) hardware and sensors (e.g., speakers, microphones, accelerometers, gyrometers, antennas, radios, etc.) 615, and memory subsystem 620. Of course, this list of components is meant to be exemplary, and not in any way limiting of the types or numbers of components that may be present in electronic device 600.

EXAMPLES

The following examples pertain to additional embodiments.

Example 1 is a battery charging system, comprising: a controller configured to couple to a battery gauge of a battery and a plurality of power converters, so as to supply power to a terminal of the battery, wherein the controller is configured to repeatedly update a servo target at a first rate in accordance with a first feedback control loop process that is based on a comparison between one or more profile target values of a charging profile and one or more battery metrics, wherein the one or more battery metrics are determined by the battery gauge, wherein each of the plurality of power converters has an assigned priority level, and wherein the plurality of converters are configured to simultaneously charge the battery, in accordance with their respective assigned priority level and the servo target.

Example 2 includes the subject matter of example 1, further comprising the battery gauge, wherein the battery gauge is coupled with one or more sensors in the battery, and at least one of the one or more battery metrics is based on at least one of a battery current or a battery voltage measured by the one or more sensors.

Example 3 includes the subject matter of example 1, wherein the controller is further configured to set a target value for each of the plurality of power converters based, at least in part, on the servo target.

Example 4 includes the subject matter of example 3, wherein the controller is further configured to set the target value of the power converter having the highest assigned priority level to the value of the servo target.

Example 5 includes the subject matter of example 3, wherein the controller is further configured to set decreasing target values for each of the plurality of power converters in decreasing order of assigned priority level.

Example 6 includes the subject matter of example 5, wherein the target value for a given power converter is set to the target value of the power converter having an immediately higher priority level minus a difference offset amount.

Example 7 includes the subject matter of example 6, wherein the difference offset amount is determined based, at least in part, on an accuracy of the given power converter and the power converter having the immediately higher priority level.

Example 8 includes the subject matter of example 6, wherein the difference offset amount is not fixed for each of the plurality of power converters.

Example 9 includes the subject matter of example 1, wherein the assigned priority level of a power converter is based, at least in part, on a characteristic of a power supply coupled to the power converter.

Example 10 includes the subject matter of example 1, wherein the assigned priority level of a power converter is not fixed.

Example 11 includes the subject matter of example 1, wherein the controller is further configured to hold the servo target at a fixed value when each of the plurality of power converters is limited by at least one of: a battery rail voltage, an input voltage of the given power converter, an input current of the given power converter, a die thermal limit, or a duty cycle of the given power converter.

Example 12 includes the subject matter of example 1, wherein each of the plurality of power converters comprises a uni-directional power converter.

Example 13 includes the subject matter of example 1, further comprising a charging profile selector, wherein the charging profile selector is configured to update the one or more profile target values of the charging profile based on the one or more battery metrics determined by the battery gauge.

Example 14 is a method performed by a battery charging system, comprising: determining, by a battery gauge of a battery, one or more battery metrics of the battery; repeatedly updating a servo target at a first rate, in accordance with a first feedback control loop process that is based, at least in part, on a comparison between one or more profile target values of a charging profile and the one or more battery metrics; and repeatedly adjusting a plurality of power converters that supply power to a terminal of the battery, wherein each of the plurality of power converters has an assigned priority level, and wherein the plurality of power converters are configured to simultaneously charge the battery, in accordance with their respective assigned priority level and the servo target.

Example 15 includes the subject matter of example 14, further comprising: comparing the one or more battery metrics to the corresponding profile target values of the charging profile to determine a minimum error, and updating the servo target based on the minimum error, in accordance with the first feedback control loop process.

Example 16 includes the subject matter of example 14, wherein configuring the plurality of power converters further comprises: setting a target value of the power converter having the highest assigned priority level to the value of the servo target; and setting decreasing target values for each of the plurality of power converters in decreasing order of assigned priority level.

Example 17 includes the subject matter of example 16, further comprising: adjusting the assigned priority level of at least one of the plurality of power converters.

Example 18 includes the subject matter of example 16, further comprising: holding the servo target at a fixed value when each of the plurality of power converters is limited by at least one of: a battery rail voltage, an input voltage of the given power converter, an input current of the given power converter, a die thermal limit, or a duty cycle of the given power converter.

Example 19 is a portable electronic device, comprising: a battery; and a controller, wherein the controller is configured to: couple to a battery gauge, wherein the battery gauge is configured to determine one or more battery metrics of the battery; couple to a plurality of power converters, wherein the plurality of power converters are configured to supply power to a terminal of the battery; and repeatedly update a servo target of a first feedback control loop at a first rate, based on a comparison between a charging profile and the one or more battery metrics determined by the battery gauge, wherein each of the plurality of power converters has an assigned priority level, and wherein the plurality of converters are configured to simultaneously charge the battery, in accordance with their respective assigned priority level and the servo target.

Example 20 includes the subject matter of example 19, wherein the controller is further configured to set a target value for each of the plurality of power converters based, at least in part, on the servo target.

Example 21 includes the subject matter of example 20, wherein the controller is further configured to set the target value of the power converter having the highest assigned priority level to the value of the servo target.

Example 22 includes the subject matter of example 20, wherein the controller is further configured to set decreasing target values for each of the plurality of power converters in decreasing order of assigned priority level.

Example 23 includes the subject matter of example 22, wherein the target value for a given power converter is set to the target value of the power converter having an immediately higher priority level minus a difference offset amount.

Example 24 includes the subject matter of example 23, wherein the difference offset amount is determined based, at least in part, on an accuracy of the given power converter and the power converter having the immediately higher priority level.

Example 25 includes the subject matter of example 19, wherein each of the plurality of power converters comprises a uni-directional power converter.

Example 26 includes the subject matter of example 19, wherein the assigned priority level of a power converter is based, at least in part, on a characteristic of a power supply coupled to the power converter.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled.

The invention claimed is:

1. A battery charging controller configured to couple to a battery gauge of a battery and a plurality of power converters, so as to supply power to a terminal of the battery, wherein the controller is configured to:
   assign a priority level to each of the plurality of power converters;
   set a target value for each of the plurality of power converters in accordance with a feedback control loop based on a comparison between one or more profile target values of a charging profile and one or more battery metrics measured by one or more sensors; and
   cause the plurality of converters to simultaneously charge the battery in accordance with their respective assigned priority levels and target values.

2. The battery charging controller of claim 1, wherein the controller is further configured to set decreasing target values for each of the plurality of power converters in decreasing order of assigned priority level.

3. The battery charging controller of claim 2, wherein the target value for a given power converter is set to the target value of the power converter having an immediately higher priority level minus a difference offset amount.

4. The battery charging controller of claim 3, wherein the difference offset amount is determined based, at least in part, on an accuracy of the given power converter and the power converter having the immediately higher priority level.

5. The battery charging controller of claim 3, wherein the difference offset amount is not fixed for each of the plurality of power converters.

6. The battery charging controller of claim 1, wherein the assigned priority level of a power converter is based, at least in part, on a characteristic of a power supply coupled to the power converter.

7. The battery charging controller of claim 1, wherein the assigned priority level of a power converter is not fixed.

8. The battery charging controller of claim 1, further comprising a charging profile selector, wherein the charging profile selector is configured to update the one or more profile target values of the charging profile based on one or more battery metrics measured by a battery gauge.

9. A method performed by a battery charging system, comprising:
   assigning, by a controller of the battery charging system, a priority level to each of a plurality of power converters;
   configuring the plurality of power converters to simultaneously charge a battery in accordance with their respective assigned priority levels and responsive to a feedback control loop comprising a comparison between one or more profile target values of a charging profile and one or more battery metrics measured by a battery gauge.

10. The method of claim 9, further comprising:
comparing the one or more battery metrics to the corresponding profile target values of the charging profile to determine a minimum error, and
updating a servo target based on the minimum error, in accordance with the first feedback control loop process.

11. The method of claim 9, wherein configuring the plurality of power converters further comprises:
setting a target value of the power converter having the highest assigned priority level to the value of a servo target; and
setting decreasing target values for each of the plurality of power converters in decreasing order of assigned priority level.

12. The method of claim 11, further comprising: adjusting the assigned priority level of at least one of the plurality of power converters.

13. The method of claim 11, further comprising: holding the servo target at a fixed value when each of the plurality of power converters is limited by at least one of: a battery rail voltage, an input voltage of the given power converter, an input current of the given power converter, a die thermal limit, or a duty cycle of the given power converter.

14. A portable electronic device, comprising:
a battery; and
a controller configured to:
couple to a battery gauge configured to measure one or more battery metrics of the battery;
couple to a plurality of power converters configured to supply power to a terminal of the battery;
assign a priority level to each of the plurality of power converters; and
configure the plurality of power converters to simultaneously charge the battery in accordance with their respective assigned priority level and a feedback control loop based on a comparison between a charging profile and the one or more battery metrics.

15. The portable electronic device of claim 14, wherein the controller is further configured to set a target value for each of the plurality of power converters based, at least in part, on a servo target derived from the feedback control loop.

16. The portable electronic device of claim 15, wherein the controller is further configured to set decreasing target values for each of the plurality of power converters in decreasing order of assigned priority level.

17. The portable electronic device of claim 16, wherein the target value for a given power converter is set to the target value of the power converter having an immediately higher priority level minus a difference offset amount.

18. The portable electronic device of claim 17, wherein the difference offset amount is determined based, at least in part, on an accuracy of the given power converter and the power converter having the immediately higher priority level.

19. The portable electronic device of claim 14, wherein the assigned priority level of a power converter is based, at least in part, on a characteristic of a power supply coupled to the power converter.

* * * * *